Oct. 17, 1950 — J. FRANKLIN — 2,526,548

ILLUMINATED HUBCAP

Filed Feb. 8, 1947

Joseph Franklin
INVENTOR.

BY
ATTORNEY.

Patented Oct. 17, 1950

2,526,548

UNITED STATES PATENT OFFICE 2,526,548

ILLUMINATED HUBCAP

Joseph Franklin, Los Angeles, Calif.

Application February 8, 1947, Serial No. 727,387

2 Claims. (Cl. 240—8.12)

This invention relates in general to the illumination of automobiles, and in particular to wheel-carried illuminating means for such vehicles.

One of the objects of the invention is the provision of a novel and useful wheel-carried illuminating device which makes the automobile equipped therewith readily visible at night and under other poor visibility conditions to the drivers of other vehicles approaching at angles in which the outer faces of the wheels carrying the illuminating means come within the line of vision of such drivers, thereby providing a safety signal for reducing accident hazards in driving at night and under other poor visibility conditions.

Another object is to provide a wheel-carried illuminating means which will serve to advantage as a colorful advertising novelty and as a decorative illuminating means for the sides of the automobile.

Another object is to provide a wheel-carried light such as described, which is readily removable and replaceable, and when removed may be used as a utility light in making inspections, repairs and tire changes.

A further object is the provision of a wheel-carried light which is carried in the removable hub caps of wheels of the vehicle, subject to ready connection with the electric lighting system of the automobile and ready removal from the wheel for use as a utility light.

Yet another object is to provide a simple and inexpensive illuminated hub cap which rotates with the wheel to which it is attached and gives the effect of rings of light in one or more colors as desired to accomplish the objects hereof in a particularly efficacious manner.

Figure 1:
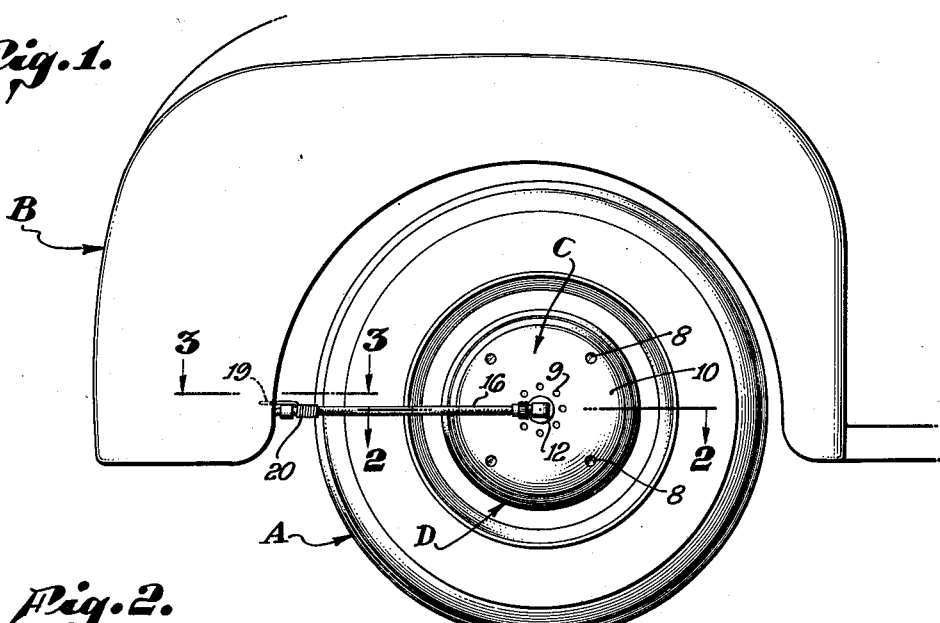
Fig. 1 is a fragmentary side elevation of an automobile showing how the illuminating means hereof is applied to the rear wheels thereof.

In carrying out my invention as shown in the accompanying drawing, wheels A on both sides of an automobile B, only one rear wheel being here shown, are equipped with illuminating means such as the one here illustrated and generally designated C. As the rear wheels are better adapted, the present embodiment of my invention is provided on such rear wheels and located in the usual removable hub caps D thereof.

In the present embodiment of my invention the hub cap D of each rear wheel is provided with a concavo-convex reflector 5, supported interiorly thereof by means of coiled springs 6, suitably fastened at its ends to the reflector and hub cap so that the reflector is resiliently maintained in a position circumferentially spaced from the hub cap with the springs dampening vibrations and preventing rattling.

An electric light 7 is mounted in the cap so that the reflector will direct light through two circular series of openings 8 and 9, formed in the outer or closed end 10 of the hub cap. This light is mounted in a socket 11, fitted on the inner end of an elbow 12, which extends through an opening 13 in the outer end 10 of the cap. The elbow 12 is supported in a ball-bearing unit 14 fixed in the opening 13, and providing for rotation of the cap around the elbow. A flange 15 on the elbow abuts the bearing 14 to limit the inward extension of the elbow. The socket 11 is removably fitted on the inner end of the elbow so as to abut the bearing 14, and thus in co-operation with the flange 15 holds the elbow securely in place. This arrangement affords a ready assembly and disassembly of the socket-elbow unit.

Figure 2:
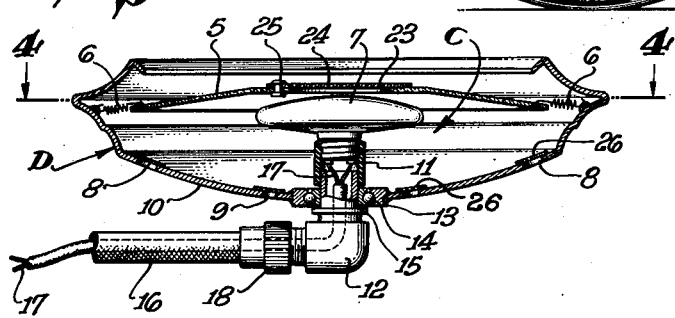
Fig. 2 is a fragmentary sectional view taken on the line 2—2 of Fig. 1, on an enlarged scale, showing the construction and arrangement of the illuminating means and hub cap.
Figure 3:
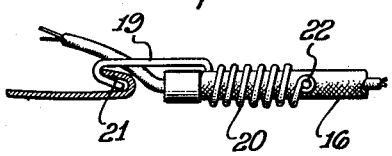
Fig. 3 is an enlarged fragmentary sectional view taken on the line 3—3 of Fig. 1; and, Fig. 4 is a fragmentary rear elevation of the hub cap and illuminating means contained therein.
Figure 4:
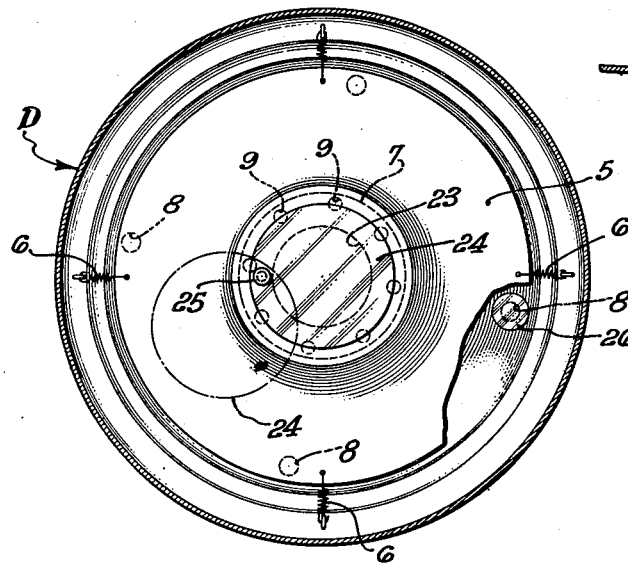

A flexible cable 16 containing conductors 17 provides for electrical connection of the socket as shown in Fig. 2, with the regular lighting system of the automobile, and is here shown as connected by means of a coupling 18 with the outer end of the elbow 12, so that the conductors 17 will lead through the elbow to the socket 11. The manner of connecting the conductors to the source of electrical energy in the automobile is not here shown as it is obvious that the connection may be made in various ways as may be desired by persons skilled in this art, for example, to the headlight circuit, and thus controlled from the regular lighting switch.

In order that the cable and conductors be properly held against flopping around and in the desired position, yet allowed to yield to incidental vibrations and relative movement of the wheels and body of the automobile, a hook 19 is attached to the cable by means of a coiled spring 20, and is adapted to be hooked around the rolled under edge or bead 21 of the rear fender. The spring 20 encompasses the cable and is secured thereto by means of the fastening 22, the hook 19 being in this instance an integral extension of said spring.

To provide for use of the hub cap light hereof as a utility light in changing tires, making repairs and inspections, the reflector 5 is provided with a central opening 23 normally covered by a cover 24 pivoted on the reflector, as at 25. When the hub cap is removed from the wheel in the usual manner, the cover 24 may be swung to one side of the opening 23 so that the light from the electric light 7 will be emitted through said opening and may be directed as desired by placing the hub cap on the ground or holding it to illuminate the automobile part to be inspected or repaired, or to illuminate the wheel area when changing tires. The flexibility of the cable affords the positioning of the hub cap so as best to direct the light as desired.

It should be noted that the hub cap hereof has a large cavity, as is the case with most present day caps, whereby the reflector light and associated parts may be readily mounted therein without interfering with the usual provisions for detachably mounting the cap on the wheel. In fact most of the caps on modern automobiles are adapted to the purposes of this invention with but minor changes in the construction thereof.

While the automobile is being driven, the circular series of openings 8 and 9 in the hub cap emit the reflected light so as to produce the effect of two rings of light which can be plainly seen by the drivers of other vehicles approaching from the sides of the automobile equipped with the wheel lights, or at angles in which the outer sides of the rear wheels of said automobile can be seen. At night and under other poor visibility conditions, such as during heavy rains and foggy weather, the illuminating means of this invention serves as an effective safety signal, particularly at intersections, and makes the automobile equipped with such means visible so as to avoid accidents which are prevalent under the poor visibility conditions herein noted with the modern automobile, due to the fact that they are not illuminated on the sides thereof, and cannot be readily seen.

If desired, the openings 8 and 9 may be covered by means of colored translucent members or lenses 26, for example, the larger openings 8 with red lenses, and the small openings 9 with orange lenses, to provide a readily recognized warning signal, or any colors may be used as desired, and in all cases will provide a decorative effect beyond that obtained with ordinary light.

It will now be apparent that the wheel-carried light hereof may be readily and inexpensively provided and embodied in hub caps to provide useful illumination, a side signal, and a utility light, as well as serve as a colorful ornamentation for display or advertising purpose, all in a particularly efficacious manner.

While I have shown and described a specific embodiment of my invention I do not limit myself to the exact details of construction set forth, and the invention embraces such changes, modifications and equivalents of the parts and their formation and arrangement as come within the purview of the appended claims.

I claim:

1. In illuminating means for application to a wheel of an automobile, a hub cap constructed and arranged to be detachably mounted on a wheel of an automobile, and having light-emitting openings therein, and illuminating means mounted within said hub cap so as to direct light outwardly through said openings, said illuminating means including a reflector, an electric light, means for supporting said light within said hub cap so that the wheel hub cap and reflector will revolve around said light, a flexible conductor and means for electrically connecting said light to a source of electrical energy of the automobile, said reflector having an opening therein through which light may be emitted, a cover normally closing said opening and adapted to be moved to uncover said opening upon removal of the hub cap, whereby the illuminating means and cap may be used as a trouble or utility light in making inspection, repairs and tire changes in the area adjacent said wheel.

2. In an illuminating device adapted for attachment to a wheel of an automobile, a hub cap adapted to be detachably mounted on such a wheel and having light-emitting openings therein, an electric light, means supporting said light in said hub cap so that said cap will revolve around said light, a reflector mounted in said hub cap so as to reflect light through said openings, and being fixed to said hub cap for rotation therewith relative to said light, and means affording electrical connection of said light with the automobile-carried source of electrical energy, said supporting means including an elbow extending into said cap, a bearing carried by the cap and through which said elbow extends so that the cap will revolve around said elbow, a light socket carried by said elbow, said elbow being a part of the means affording electrical connection of the light with said source of energy.

JOSEPH FRANKLIN.

REFERENCES CITED

The following references are of record in the file of this patent:

UNITED STATES PATENTS

| Number | Name | Date |
| --- | --- | --- |
| 1,456,258 | Stoner | May 22, 1923 |
| 1,478,587 | Stoner | Dec. 25, 1923 |
| 1,582,245 | Bruder | Apr. 27, 1926 |
| 1,739,577 | Cantu | Dec. 17, 1929 |
| 1,876,952 | Johns | Sept. 13, 1932 |
| 2,027,478 | Hamer | Jan. 14, 1936 |
| 2,083,514 | Brown | June 8, 1937 |
| 2,311,743 | Elfner | Feb. 23, 1943 |